Oct. 29, 1963  G. AZZOLARI  3,108,486
MANUAL AND AUTOMATIC DEVICE FOR THE DISPLACEMENT OF THE
DRIVE BELTS, MORE PARTICULARLY FOR HOSIERY
OR SIMILAR MACHINES
Filed Dec. 28, 1960  3 Sheets-Sheet 1

INVENTOR
Guido Azzolari
BY
Watson, Cole, Grindle & Watson
Attys.

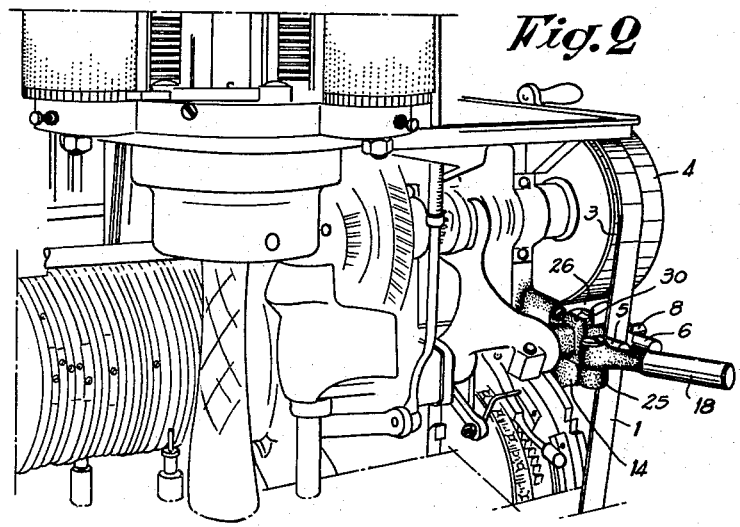
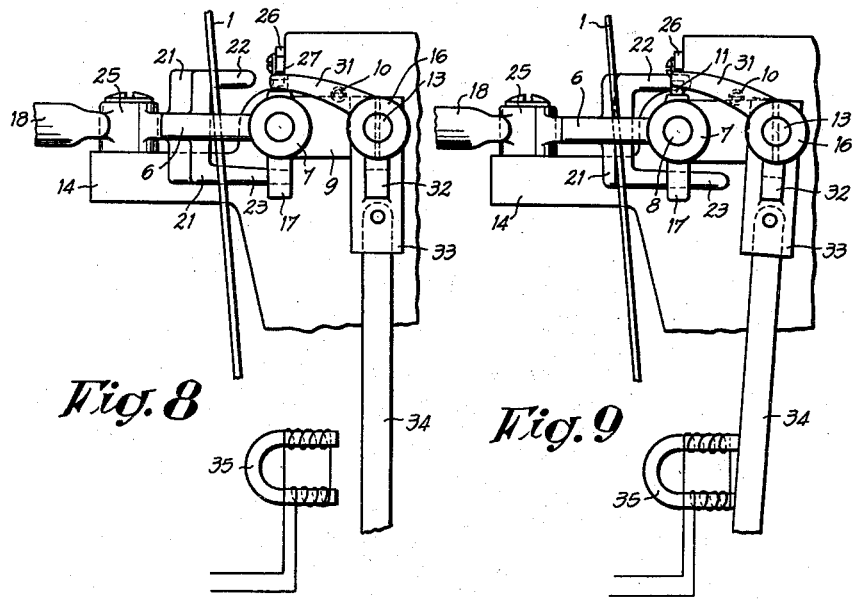

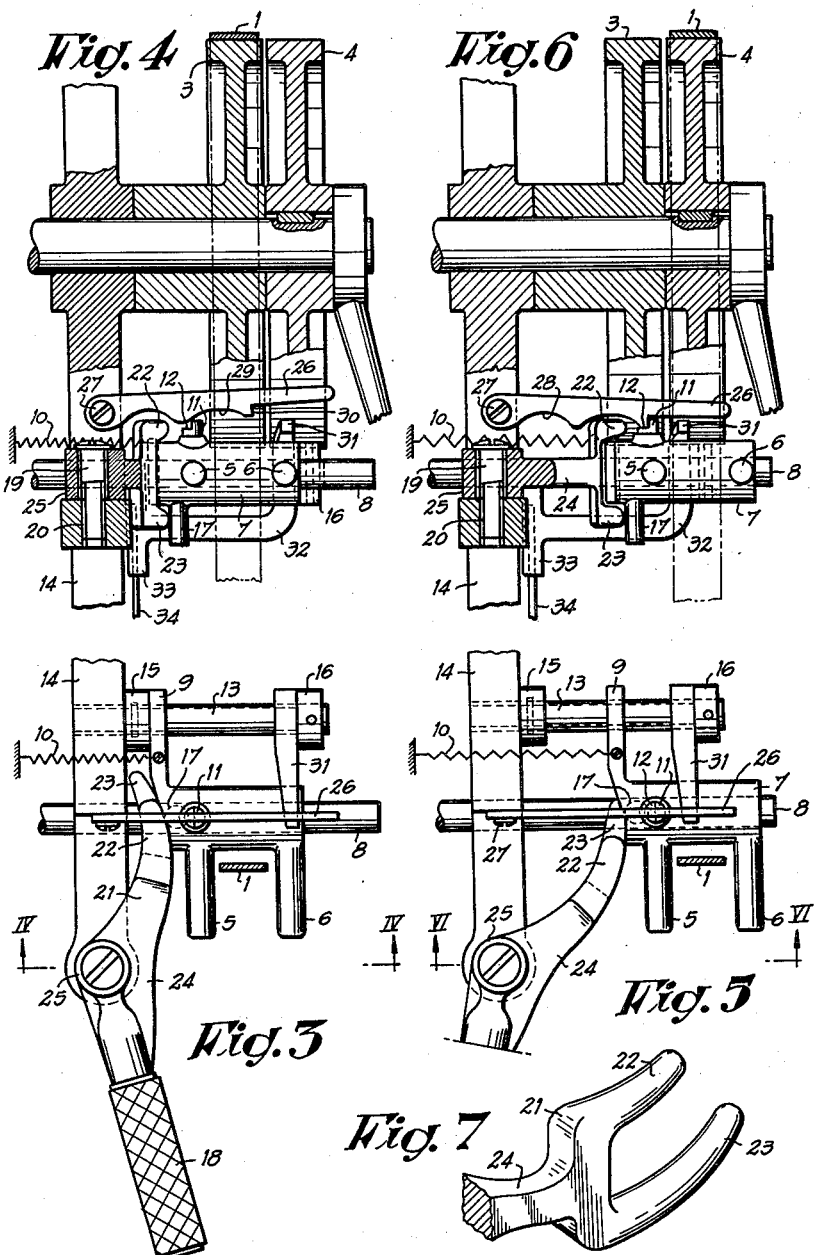

3,108,486
MANUAL AND AUTOMATIC DEVICE FOR THE DISPLACEMENT OF THE DRIVE BELTS, MORE PARTICULARLY FOR HOSIERY OR SIMILAR MACHINES
Guido Azzolari, Brignano d'Adda, Italy, assignor to Fabrique Nationale d'Armes de Guerre, Societe Anonyme, Herstal-near-Liege, Belgium
Filed Dec. 28, 1960, Ser. No. 78,879
Claims priority, application Italy Jan. 5, 1960
9 Claims. (Cl. 74—242)

The invention is concerned with a starting, and respectively stopping mechanism for textile machines and more particularly for hosiery machines. Generally such machines are started by hand and have to be stopped automatically, either for accidental reasons, or at the end of a fabrication program, or respectively when the yarn supply runs out.

At present, such known mechanisms are relatively complex and in any case do not possess the characteristics of instantaneousness required by modern machines, both with regards to the very high speed of the knitting and to the ever increasing number of chutes, and consequently of the number of threads implied in the knitting work.

For the starting, and respectively stopping, of such machines, the drive belt has to be displaced laterally between the drive mechanism and the fixed and idler-driven pulleys.

The starting, i.e. transferring of the drive belt from the idler pulley to the fixed pulley, is effected manually by means of an appropriate lever; the almost instantaneous stopping of the machine on the other hand, either through accidental causes or at pre-determined moments, is effected automatically by means of an electro-magnetic device. It is quite obvious that it must remain possible also to stop the machine manually.

These manual or automatic operations must of course be carried out systematically, without impairing in any way the perfect guiding of the belt on the idler and fixed pulleys respectively.

The device, subject of this invention, is a simple mechanism which functions in a particularly rational manner and with a maximum degree of security, satisfying the various previously mentioned conditions, which on the other hand constitute its main characteristics.

In substance, the device which is the object of the invention consists of a combination of at least one slider or chariot carrying the yoke which transfers the belt from one pulley to the other; a permanent return device of aforesaid slider or chariot tending to maintain the latter in its initial position which corresponds to the belt on the idler pulley; a device for engaging or blocking aforesaid slider or chariot at least in the position corresponding to the belt being on the drive pulley; a control lever rigidly fixed to a cam which is capable of setting in motion aforesaid slider or chariot as well as aforesaid engaging or blocking device, and finally, an electro-magnetic control mechanism which controls the position of abovementioned engaging or blocking device.

The various elements of this combination are essentially variable in shape, dimensions, and relative position. The only conditions which have to be fulfilled are: that when aforesaid lever, and consequently the cam to which it is attached, is adequately operated, the slider or chariot is displaced transversally, transferring the belt from the idler to the drive pulley; the return device is taut; and, later, the engaging device blocks aforesaid slider or chariot. This engaging device can be operated by the electro-magnetic mechanism. The latter is such, that when its electro-magnetic drive system is energized by the closing of its circuit by means of switches or micro-switches located at the control points of the machine, it operates aforesaid engaging device in such a manner that the slider or chariot is almost instantaneously returned to its initial position, i.e. belt on idler pulley.

It is thus merely as an example and without the slightest intent of limitation, that a form of embodiment is described hereafter in more detail and with reference to the appended drawings in which:

FIGURE 2 is an enlarged perspective view of part of aforesaid machine, showing the location of the control device, subject of this invention;

FIGURE 3 is a top view of the mechanical part of the control device, subject of this invention, shown in its position of rest, belt on idler pulley;

FIGURE 4 is a cross-section according to line IV—IV of FIGURE 3;

FIGURE 5 is a top view similar to FIGURE 3, the device being however represented in its position corresponding to the belt on the drive pulley;

FIGURE 6 is a cross section of FIGURE 5 according to line VI—VI;

FIGURE 7 shows a perspective view of the front part of the slider or chariot control cam;

Figure 1:
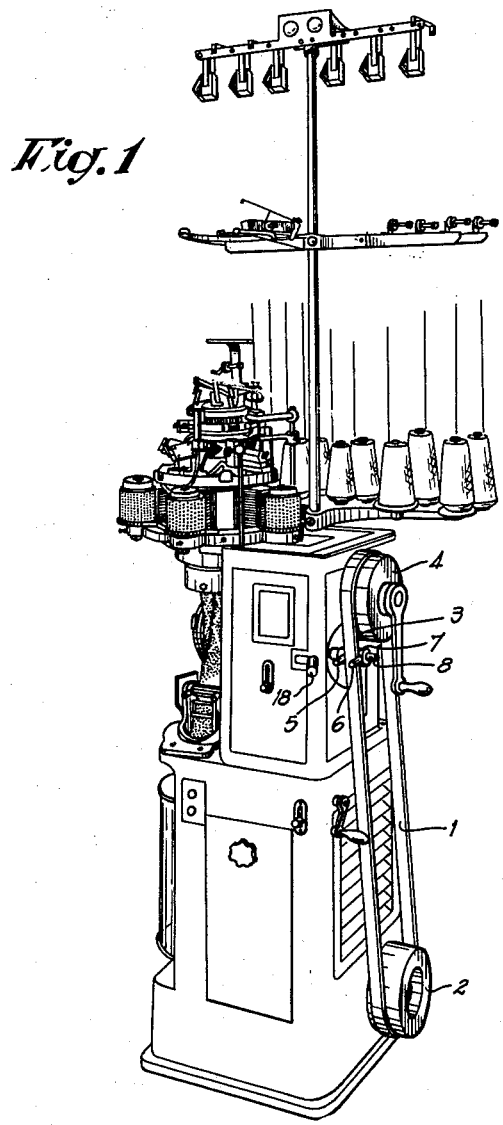
FIGURE 1 represents a perspective view of a knitting machine to which the device, subject of this invention, has been applied.

FIGURE 8 gives a schematic representation of the electro-magnetic control mechanism of aforesaid mechanical device in position of rest;

FIGURE 9 is similar to FIGURE 8, the mechanism being however in its active position.

In the illustrated embodiment, the device according to the invention has the function of positively controlling the transverse displacements of belt 1 which is driven by pulley 2 of the motor (not shown) of the machine, so as to drive either idler pulley 3 or driven pulley 4. In this device, the yoke 5—6 is fixed to a slider or chariot 7 which is positively guided along a shaft 8 passing longitudinally right through same and being fixed by any appropriate means (not shown) to the general frame of the machine. In the illustrated example, slider or chariot 7 is provided with an arm 9, to which is attached one end of a return spring 10, the other end of which is fixed to some part of the general frame of the machine.

At its top end, aforesaid slider or chariot 7 carries a projection 11 which is provided with a groove or step 12 directed towards the return spring 10.

Aforesaid arm 9 is supported by a guide shaft 13, fixed at one end in element 14 which is part of the general frame of the machine, and is fitted with two stops 15—16. In this manner aforesaid chariot or slider 7 is positively guided simultaneously by guide shafts 8—13, thus guaranteeing a correct predetermined position and a possibility of motion exclusively in the direction parallel to the shafts of driving and driven pulleys 3—4. The chariot also bears a lower finger 17, which is preferably of cylindrical shape. The manual control device is mainly as follows: A control lever 18 fits idly over shaft 19 which consists of the upper part of a bolt, the threaded part of which screws into the corresponding part of aforesaid element 14 which is part of the general frame of the machine.

Solidly fixed to this lever is a cam 21 of most particular shape. In top view, as shown in FIGURES 3, 5 and 7, it is curved, whilst seen in elevation it has the shape of a yoke, the arms 22—23 of which are of unequal length, the top arms 22 being shorter than the bottom arm 23, the latter having to remain in permanent contact with aforementioned finger 17 of chariot or slider 7. Aforesaid yoke 22—23 joins up with end 25 of aforesaid control lever by means of branch 24.

The shape, dimensions and orientation of aforesaid cam 21 are such, that in one of the positions (FIGURES 3 and 4) of lever 18, the slider or chariot 7 is maintained in its left hand position by the pull of return spring 10, this position corresponding to the belt 1 being on the idler pulley 3, whilst in the other characteristic position of aforesaid lever 18 (FIGURES 5 and 6), aforesaid slider or chariot 7 is pushed back by branch 23 of aforesaid cam 21 acting upon aforesaid finger 17 against the pull of return device 10, so that it takes up the position in which aforesaid belt 1 drives fixed pulley 4.

The shape, dimensions and orientation of cam 21 are also such, that in the course of these two movements of control lever 18, the top branch 22 of cam 21 has successively operated and liberated the engaging device. The latter is located above slider or chariot 7. It consists in this case of a bar 26 which extends above and over a considerable part of the length of aforementioned guide shaft 8 and is hinged at one end around a pivot pin 27 which is anchored in aforesaid element 14 which is part of the general frame of the machine. Aforesaid bar 26 is free to oscillate around aforesaid pivot pin and is permanently acted upon by gravity so that it takes up its lower or rest position bearing against a subjacent element. The lower edge of aforesaid bar 26 has a particular profile consisting of a double concave curvature 28—29 followed by a blocking tooth 30.

The distance of this blocking tooth 30 from pivot 27 of aforesaid bar 26 corresponds exactly to the position of step 12 of projection 11 on the slider or chariot when the latter is in its active position, in which belt 1 drives fixed pulley 4. In the rest position, aforesaid bar will bear by means of its hump which separates both concave curvatures 28—29 upon aforesaid projection 11, upper branch 22 of the cam being located under the first concave curvature 28 of the engaging bar, lower branch 23 remaining in contact with finger 17 of slider or chariot 7.

The automatic operating device substantially consists of the following: a curved arm 31 is carried by aforementioned guide shaft 13 around which it is free to rotate; it is connected by means of an angle piece 32 to a yoke 33 into which is fitted the top end of a bar or lever 34. Opposite the latter an electro-magnetic device 35 is located, the energizing current of which is controlled by switches or micro-switches (not shown) located at convenient points of the machine, namely to be operated by accidental causes or in predetermined conditions.

The operation of this device is as follows: when the machine is stopped; control lever 18 is in its position represented in FIGURE 3, the chariot or slider 7 occupies its left hand position, belt 1 driving idler pulley 3.

In order to start up the machine, it will be sufficient to effect an angular displacement of aforesaid control lever 18 in order to place it in the position shown in FIGURE 5. During this movement, upper arm 22 of the cam has lifted engaging bar 26 whilst lower arm 23 has transversally displaced aforesaid chariot or slider 7 to a position beyond blocking tooth 30. The latter drops into step 12 of projection 11 which is solidly attached to chariot or slider 7. This slider is thus held fast although it remains subjected to the permanent pull of the elastic return device schematically represented by 10. If the machine has to be stopped by manual operation, it will be sufficient to displace control lever 18 back into its original position. During this displacement, upper arm 22 of the cam will lift engagement bar 26 thus liberating chariot or slider 7; the latter, being progressively liberated by the retracting lower arm 23, will return to its initial position being subjected to the strain of elastic device 10. If, on the other hand, the machine must be stopped automatically, due to either an accidental or a foreseen cause the appropriate switch or microswitch having closed, an energizing current is sent through electro-magnetic device 35, which then attracts bar 34 rotating the latter around shaft 13. In so doing, aforesaid bar will move arm 31, which in its turn will push up on engagement bar 26, thus liberating chariot or slider 7 which will automatically be pulled back to its initial position simultaneously resetting control lever 18 in its starting position, cam 21 being pushed back by aforesaid chariot or slider.

It is quite obvious, that the various parts described above and represented in the appended drawings might very well be replaced by any equivalent parts such or which have equivalent functions, without modifying the scope of the invention.

The latter also extends to all mechanisms which apply the above mentioned characteristics.

What I claim is:

1. A manual device for displacing a drive belt, more particularly for hosiery machines, from an idler pulley to a driven pulley and vice versa, comprising at least one slider having a yoke which transfers the belt from one pulley to the other; a return device permanently urging said slider to return to its initial position in which the belt is located on the idler pulley; a blocking device for said slider to maintain the latter in the position corresponding to the belt being on the driven pulley; a cam for the slider; a manually operated control lever fixed to the cam capable of displacing said slider as well as said blocking device, there being only the lever in combination with the cam mechanism and the pivotally mounted bar to cause movement and locking of the said slider; and an electro-magnetic control mechanism to disengage the said blocking device, the said electro-magnetic control mechanism being operated by means on the machine to operate the control mechanism in response to accidental causes.

2. A device according to claim 1, characterized by a transfer yoke for the belt and a control cam provided so that the slider is positively guided in its transverse movements and carries at least the transfer yoke of the belt, a finger which is in permanent contact with the control cam and a projection which interacts with the blocking device of said slider when the latter is in a position where the belt is on the driven pulley.

3. A device according to claim 1, characterized by the fact that the slider is guided simultaneously by two parallel guide shafts.

4. A device according to claim 1, characterized by the fact that the operating cam for the slider, which is securely attached to the control lever, has a curved shape when viewed from the top and has the shape of a yoke when seen in elevation, one of its arms controlling the said blocking device, the other arm pressing against the slider.

5. A device according to claim 1, characterized by the fact that the yoke has two arms of unequal length, the arm controlling the blocking device being shorter than the arm which presses against the slider so that the blocking device will be free to engage the slider when the slider reaches the position corresponding to the belt driving the fixed pulley.

6. A device according to claim 1, wherein by the fact that the blocking device consists of a bar which is hinged at one end and extends over and across the slider, the lower edge of said bar being shaped with two successive concave curvatures and one blocking tooth.

7. A device according to claim 1, characterized an engagement bar is provided and in which the blocking device consists of a bar which is hinged at one end and extends over and across the slider, the lower edge of said bar being shaped with two successive concave curvatures and one blocking tooth, and in which the blocking tooth of the engagement bar is located to engage a step in a projection on said slider, exactly at the moment when the latter is in the position corresponding to the belt driving the fixed pulley.

8. A device according to claim 1, characterized by the fact that the control mechanism consists of an oscillating arm capable of actuating the bar of the blocking device and a lever attached to said oscillating arm and located so as to be able to cooperate with an electromagnet in the electromagnetic device.

9. A device according to claim 1, characterized by the fact that the control mechanism consists of an oscillating arm capable of actuating the bar of the blocking device and a lever attached to said oscillating arm and located so as to be able to cooperate with an electromagnet in the electromagnetic device, and the oscillating arm of the automatic device being pivoted on one of the guide shafts of the slider which carries the belt transfer yoke during its transverse movements.

References Cited in the file of this patent

UNITED STATES PATENTS

| | | |
|---|---|---|
| 315,335 | Pessano | Apr. 7, 1885 |

FOREIGN PATENTS

| | | |
|---|---|---|
| 26,413 | Great Britain | 1903 |
| 23,311 | Great Britain | of 1907 |
| 374,613 | Great Britain | June 16, 1932 |